United States Patent [19]
Waters

[11] Patent Number: 4,892,406
[45] Date of Patent: Jan. 9, 1990

[54] METHOD OF AND ARRANGEMENT FOR MEASURING VIBRATIONS

[75] Inventor: James P. Waters, Ellington, Conn.

[73] Assignee: United Technologies Corporation, Hartford, Conn.

[21] Appl. No.: 142,889

[22] Filed: Jan. 11, 1988

[51] Int. Cl.⁴ .................................................. G01B 9/02
[52] U.S. Cl. ..................................... 356/349; 356/345; 356/358
[58] Field of Search ........................ 356/349, 345, 358; 250/227

[56] References Cited

U.S. PATENT DOCUMENTS

| | | | |
|---|---|---|---|
| 4,146,373 | 8/1979 | Schuss et al. | 250/227 |
| 4,356,395 | 10/1982 | Miller | 250/227 |
| 4,395,121 | 7/1983 | Nory et al. | 250/227 |
| 4,627,731 | 12/1986 | Waters et al. | 256/345 |
| 4,743,113 | 5/1988 | Jubinski | 356/345 |
| 4,748,686 | 5/1988 | Glomb | 356/345 |

Primary Examiner—Davis L. Willis
Assistant Examiner—S. A. Turner
Attorney, Agent, or Firm—Peter R. Ruzek

[57] ABSTRACT

The movement of a predetermined zone of a surface of a vibrating object is measured by separating a laser beam having a predetermined coherence length into a probe beam and a reference beam. The reference beam is then delayed relative to the probe beam by a predetermined time interval sufficient for the probe beam to travel through a predetermined distance at least corresponding to the coherence length, before being combined with the probe beam to form a combination beam. The combination beam is then subdivided into a plurality of substantially equal component beams each of which is conducted along a separate path to a location spaced from the predetermined zone substantially by one-half of the distance traveled by light in the predetermined time interval between the above location and the predetermined zone. A predetermined portion of each component beam is reflected at the respective location back into the respective path, while the remainder of each component beam is directed to the predetermined zone for return therefrom at least predominantly back toward the respective location and into the respective path with attendant coherent interference of the returned probe beam part with the reflected reference beam part of the same component beam. The return light beam are demodulated to obtain an indication of the movement of the predetermined zone.

18 Claims, 2 Drawing Sheets

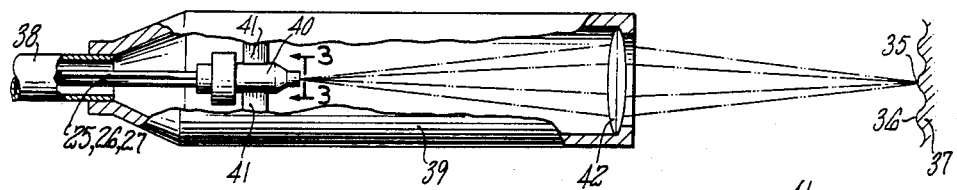
FIG. 2
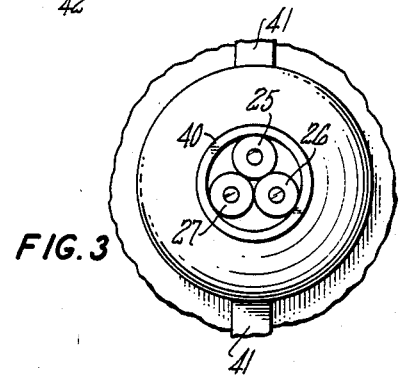
FIG. 3
FIG. 4
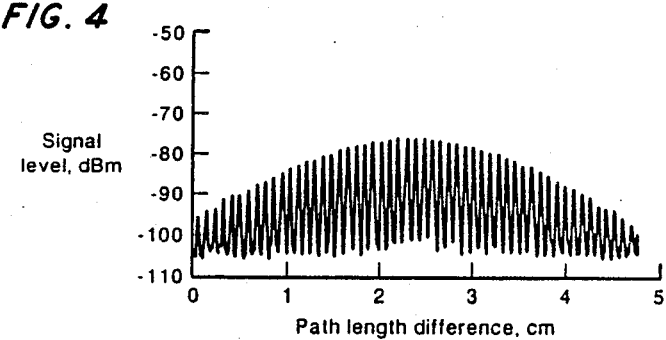
FIG. 5
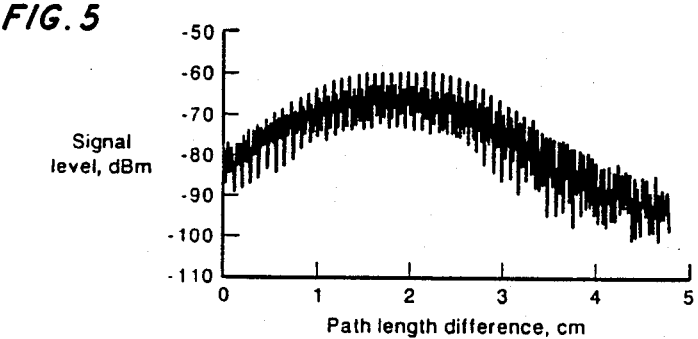

METHOD OF AND ARRANGEMENT FOR MEASURING VIBRATIONS

TECHNICAL FIELD

This invention relates to interferometric measuring systems and more particularly to optical measuring arrangements and matters using interferometers with common optical paths.

BACKGROUND ART

Various interfermetric measuring techniques and devices have been developed in the past and are still being used. With the advent of optical fibers, a large number of interferometric measuring systems employing fiber optics has been proposed. Such systems have widespread application in measuring vibration and dynamic distortion of mechanical components. Moreover, fiber optic interferometers are especially suited to metrology because of the flexibility and size of the components involved.

Fiber optic interferometers of the prior art include those characterized as modified Mach-Zehnder or Twyman-Green interferometers. In their simplest form, these interferometers use light from a coherent source split into two optical beams. One of these beams constitutes a reference beam and traverses an optical path of a fixed length. The other beam constitues a probe beam and is guided along an optical path whose length is altered by the movement of an external object or workpiece being measured. The reference and probe beams are subsequently coherently recombined to produce an interference pattern indicative of the vibration or dynamic distortion of the mechanical element.

Heterodyne optical interferometers are also well known in the art. These devices are similar to basic Mach-Zehnder and Twyman-Green interferometers but are modified to include an optical modulator which shifts the optical frequency of the reference and/or probe beam. As in the basic Mach-Zehnder or Twyman-Green interferometers, the optical path length of the probe beam is altered by the vibrating external object. The reference and probe beams are again subsequently recombined, yielding a frequency modulated (FM) beam with a carrier frequency equal to the frequency of the optical modulator and deviations from the carrier frequency caused by the vibration or dynamic distortion of the external object. The deviations which are caused by the motion of the external object are then extracted by conventional FM demodulation techniques.

In fiber optic measuring or gauging systems of the prior art, the reference and probe beams are usually guided along optical paths that include separate optical fibers. This configuration ensures that a truly stationary reference wavefront is used for comparison with the unknown Doppler shifted wavefront returning from the object. However, the optical fibers act as microphones in picking up environmental noise. This environmental noise signal is comprised of unwanted Doppler shifts due to environmental vibrations and attendant slight variations in the refractive index of the optical fiber carrying the probe or reference beam, and is added to the measured vibration signal from the object the motion of which is being measured, resulting in a distortion of the actual vibration frequency and amplitude signature imposed onto the returning light beam. This has, in effect, precluded the use of fiber optic conventional or heterodyne interferometers in typical manufacturing environments.

To avoid this drawback, it was proposed in a commonly owned U.S. Pat. No. 4,627,731, issued Dec. 9, 1986 and entitled "Common Optical Path Interferometric Gauge", to use a laser source that produces a laser beam having a relatively short coherence length and to combine the reference and probe beams, after the reference beam has been delayed relative to the probe beam by a time interval of such a length that the reference beam lags behind the probe beam by a distance at least equal to but advantagously exceeding the aforementioned coherence length, and let the thus combined beam propagate in a common path, especially in an optical fiber, toward a location that is spaced by substantially one-half of the above distance from the surface of the object the motion of which is to be measured. At the above location, a portion of the combined beam was reflected back into the common path, while the remainder of the combined beam was aimed at a predetermined zone of the object surface and returned therefrom back to the above location and into the common path, where the returned part of the probe beam, which has been influenced by the motion of the aforementioned zone, has coherently interfered with the portion of the reference beam part that has been reflected at the above location back into the common path.

While this approach has essentially eliminated the above problem, inasmuch as the environmental noise had influenced both the probe beam and the reference beam in substantially the same manner, resulting in cancellation of the influence of the environmental noise on the interference pattern, this type of interferometric arrangement still possessed a drawback in that it was dependent on the location of the above-mentioned location with respect to the speckle pattern which is formed as the remainder of the combined beam is returned back from the affected zone of the object surface. More particularly, the above zone has a finite area which exhibits surface irregularities having magnitudes capable of distorting the wavefront of the returning combined beam even when the object surface is of a very high surface quality, so that the remainder of the combined beam is scattered to a certain degree during its reflection from the above zone and forms a speckle pattern that includes bright and dark speckles due to interference in the returning combined beam. For obvious reasons, it is not always possible to assure that the above location is situated at the bright speckle; when it is not, there occurs a signal dropout due to the low or non-existent intensity of returning light at the above location due to its alignment with the dark speckle.

Accordingly, it is a general object of the present invention to avoid the disadvantages of the prior art.

More particularly, it is an object of the present invention to provide a method of measuring the movement of a vibrating object, which does not possess the disadvantages of the known methods of this kind.

Still another object of the present invention is so to develop the method of the type here under consideration as to virtually assure that reliable measurement results are obtained in spite of the existence of the speckle pattern.

A concomitant object of the present invention is to devise a measuring arrangement capable of performing the method of the above type.

An additional object of the present invention is to design the above measuring arrangement in such a manner as to present reliable measuring results regardless of the position of the aforementioned location relative to the speckle pattern.

It is yet another object of the present invention to construct the mirror arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a method of measuring the movement of a predetermined zone of a surface of a vibrating object, which method comprises the steps of generating a laser beam having a predetermined coherence length; separating the laser beam into a probe beam and a reference beam; delaying the reference beam relative to the probe beam by a predetermined time interval sufficient for the probe beam to travel through a predetermined distance at least corresponding to the coherence length; combining the thus delayed reference beam with the probe beam to form a combination beam; subdividing the combination beam into a plurality of substantially equal component beams; conducting each of the component beams along a separate path to a location spaced from the predetermined zone substantially by one-half of the distance traveled by light in said predetermined time interval between the respective location and the predetermined zone; reflecting a predetermined portion of each of the component beams at the respective location back into the respective path; directing the remainder of each of the component beams from the respective location to the predetermined zone for return therefrom at least predominantly back toward the respective location and into the respective path with attendant coherent interference of the probe beam part of the thus returned remainder of the respective component beam with the reference beam part of the predetermined portion of the respective component beam resulting in a return light beam modulated in dependence on the movement of the predetermined zone relative to the respective location; and demodulating each of the return light beams to obtain an indication of the movement of the predetermined zone.

The present invention is also directed to an arrangement for measuring the movement of a predetermined zone of a surface of a vibrating object. According to the invention, this arrangement comprises means for generating a laser beam having a predetermined coherence length; means for separating the laser beam into a probe beam and a reference beam; means for delaying the reference beam relative to the probe beam by a predetermined time interval sufficient for the probe beam to travel through a predetermined distance at least corresponding to the coherence length; means for combining the thus delayed reference beam with the probe beam to form a combination beam; means for subdividing the combination beam into a plurality of substantially equal component beams; means for conducting each of the component beams along a separate path to a location spaced from the predetermined zone substantially by one-half of the distance traveled by light in said predetermined time interval between the respective location and the predetermined zone; means for reflecting a predetermined portion of each of the component beams at the respective location back into the respective path; means for directing the remainder of each of the component beams from the respective location to the predetermined zone for return therefrom at least predominantly back toward the respective location and into the respective path with attendant coherent interference of the probe beam part of the thus returned remainder of the respective component beam with the reference beam part of the predetermined portion of the respective component beam resulting in a return light beam modulated in dependence on the motion of the predetermined zone relative to the respective location; and means for demodulating each of the return light beams to obtain an indication of the motion of the predetermined zone.

A particular advantage obtained from the use of the method and arrangement of the present invention is that there is a plurality of the locations at which the coherent interference of the returning part of the probe beam with the reflected portion of the reference beam takes place, so that it is highly unlikely if not impossible that all of these locations would be aligned with dark regions of the speckle pattern. In view of the fact that interference pattern return from one of such locations is sufficient for detection and evaluation of the movement of the predetermined zone of the object, the method and arrangement of the present invention virtually assure that there will be detection under all circumstances, so long as the above locations are situated within a predetermined distance range from the predetermined zone and the combination beams are aimed at this zone.

BRIEF DESCRIPTION OF THE DRAWING

The present invention will be described in more detail below with reference to the accompanying drawing in which:

FIG. 2 is a partially axially sectioned side elevational view of a wand portion of a measuring arrangement that is somewhat modified relative to that of FIG. 1;

FIG. 3 is an end view of a detail of the wand portion, taken on line 3—3 of FIG. 2;

FIG. 4 is a graphic respesentation of the dependence of the signal level on the path length difference when using a single mode fiber; and FIG. 5 is a view corresponding to FIG. 4 but when a multimode fiber with a 10 micron core diameter is being used.

BEST MODE FOR CARRYING OUT THE INVENTION

Figure 1:
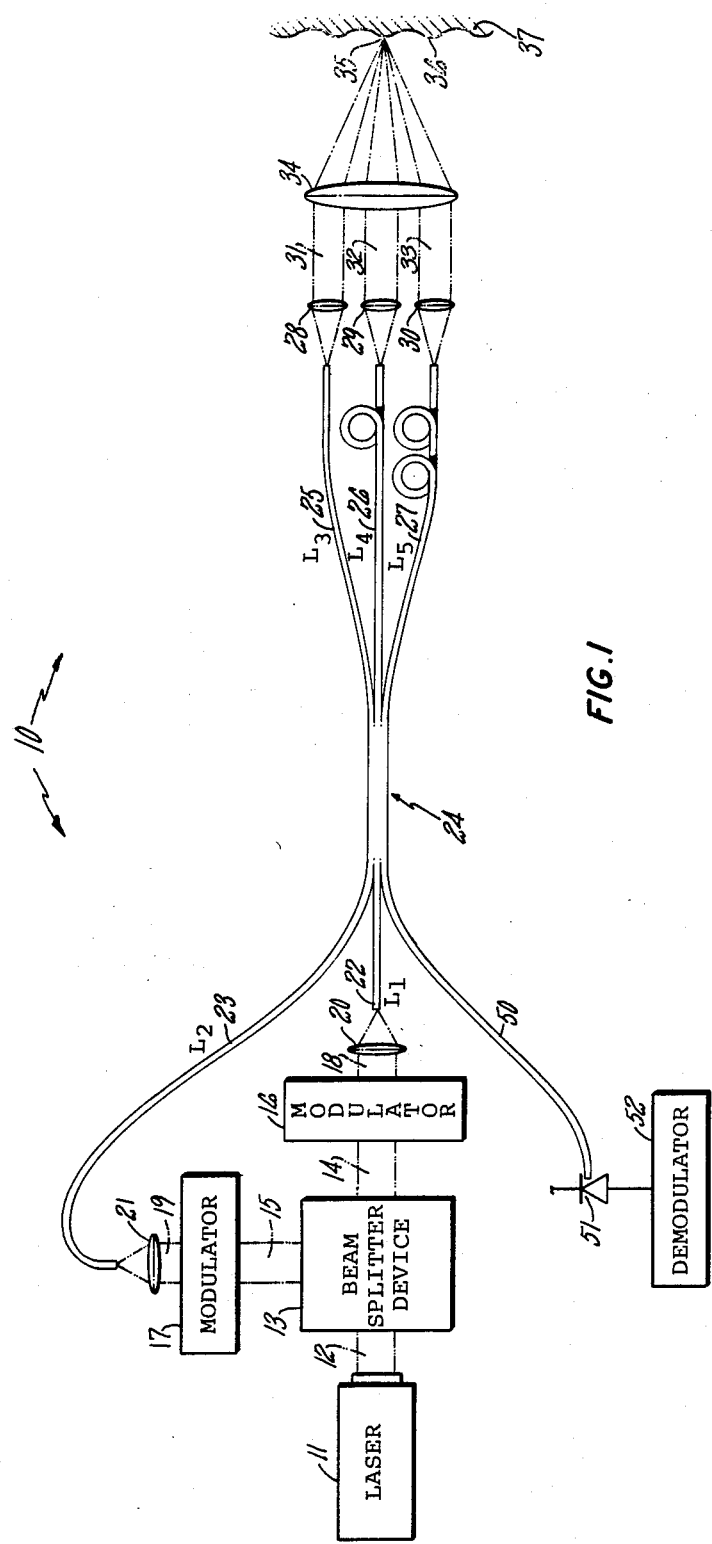
FIG. 1 is a somewhat simplified side elevational view of a measuring arrangement embodying the present invention.

Referring now to the drawing in detail, and first to FIG. 1 thereof, it may be seen that the reference numeral 10 has been used therein to identify an interferometric measuring arrangement constructed in accordance with the present invention and utilizing optical fiber elements, in its entirety. The measuring arrangement 10 includes a laser source 11, such as a laser diode marketed under the designation Sharp LT023MC which operates at a wavelength of 780 nanometers.

The laser source 11 issues a laser beam 12 having a relatively short coherence length. The laser beam 12 enters a beam splitting device 13, which may include a fiber optic coupler, a preceding focusing lens, and subsequent collimating lenses, and which splits the laser beam 12 into two substantially equal partial beams 14 and 15 that are coherent with one another. The partial beam 14 is shown to be directed onto a modulator 16, especially an acousto-optic modulator or Bragg cell that is commercially available, for instance, as a Hoya A-100 modulator. The modulator 16 downshifts the frequency of the partial beam 14 by, for example, approximately 75 MHz. Similarly, the partial beam 15 is shown to be directed onto a modulator 17 which is advantageously of the same construction as the modulator 16. The modulator 17 upshifts the frequency of the partial beam 15 by, for example, approximately 85 MHz, so that there is a 160 MHz difference between the frequencies of respective carrier-modulated laser beams 18 and 19 that emerge from the respective modulators 16 and 17. It will be appreciated that the above-mentioned frequencies and modulating frequncy distribution which have been used in a practical embodiment of the present invention are not critical and may be changed either to change the frequency difference, or to keep it and change the amounts by which the two modulators 16 and 17 contribute to this difference, ultimately to the extent that only one of the modulators 16 and 17 is being used and no carrier modulation is imposed on the other partial beam 15 or 14. In the alternative, both of the modulators 16 and 17 may be omitted if it is not desired to impose carrier modulation on the partial beams 14 and 15.

In any event, the carrier-modulated partial beams 18 and 19 (and/or the unmodulated partial beams 14 and 15) are focused by respective lenses 20 and 21 into respective optical fibers or fiber sections 22 and 23 which are shown to lead from one side to a 3×3 fiber-optic coupler 24. The fiber section 22 has a predetermined length $L_1$, and the fiber section 23 has a length $L_2$, the length $L_2$ exceeding the length $L_1$ by a distance that at least corresponds to but preferably exceeds the aforementioned coherence length. This results in a situation where any region of the partial beam propagating in the optical fiber section 23 will reach the fiber-optic coupler 24 a predetermined time interval, which corresponds to the transit time of light through the aforementioned distance, later than the corresponding coherent region of the partial beam propagating in the optical fiber section 22, so that the light in such regions will be out of coherence with one another by the time such regions reach the coupler 24.

In the coupler 24, these partial beams are incoherently combined with one another, without losing their identites as a probe beam (from the fiber 22) and reference beam (from the fiber 23), and the combined beam is then subdivided in three substantially equal component beams which leave the coupler 24 at the other side thereof and are launched into respective optical fibers 25, 26 and 27. The optical fibers 25, 26 and 27 are preferably contained in a single optical cable. When either one of the component beams reaches an end face of the respective fiber 25, 26 and 27, a portion thereof will be reflected from this end face (or from a coating applied to this end face) back into the respective fiber 25, 26 or 27 for propagation back toward the coupler 24.

The remainder of the respective component beam issues from the downstream and of the respective fiber 25, 26 or 27, and is collimated by a respective lens 28, 29 or 30 to form a respective collimated component beam remainder 31, 32 or 33, and the collimated component beam remainders are focused by a shared lens 34 onto a region or zone 35 of a surface 36 or an object whose vibrations are to be measured. At least a part of the light that reaches the zone 35 is returned back, usually as scattered radiation that, as is well known, forms a speckle pattern at the plane of the end faces of the fibers 25, 26 and 27. When the thus returned light reaches the end face of the respective fiber, it interferes with any light with which it is coherent. This means that the probe beam part of the returning light interferes with the reference beam part of the reflected portion of the combined beam in the associated optical fiber section 25, 26 or 27.

However, the returning probe beam part stemming from one of the optical fiber sections, such as 25, could also interfere with reference beam part of the reflected portion in the other optical fiber sections, such as 26 and 27. This could give erroneous results. To avoid this possibility, the optical fiber sections 25, 26 and 27 have different lengths $L_3$, $L_4$ and $L_5$, the lengths $L_4$ and $L_5$ being longer than the length $L_3$ and than one another, as indicated by a single loop in the fiber section 26 and by a double loop in the fiber section 27, and being at least in a predetermined ratio to the aforementioned distance $L_2-L_1$. According to the invention, this ratio advantageously is an integral multiple of 3. This assures that the returning remainders of either the probe beam part or the reference beam part stemming from one of the fibers 25, 26 and 27 do not coherently interfere with the reflected portions of either the probe beam part or the reference beam part propagating in any other of the fibers 26, 27 or 25.

The returning light beams propagating in the fiber optic sections 25, 26 and 27 eventually reach the 3×3 optical coupler 24 where the component beams are recombined with one another and a portion of the thus recombined light beam is conducted through another fiber section to a photodetector 51 which converts the light signal into an electrical signal, in a well known manner. This electrical signal is then demodulated in a demodulator 52 of any known construction, particularly an FM demodulator, to obtain an indication of the vibratory movement of the zone 35.

The locations of the end faces of the fiber sections 25, 26 and 27 are spaced from the zone 35 by substantially one-half of the distance traveled by light during the predetermined time interval in the medium or media situated between these end faces and the zone 35.

Turning now to FIGS. 2 and 3 of the drawing, where the same reference numerals as before have been used to identify corresponding parts, it may be seen that the reference numeral 38 designates a sheath which accommodates the downstream end portions of the fiber sections 25, 26 and 27 and is connected to a housing or wand 39. A holding member 40 is held substantially centrally in the housing 39 by respective webs 41 and confines the extreme end portions of the fiber sections in the positions thereof which are illustrated in FIG. 3, that is, at the corners of an isosceles triangle. The light emanating from the end faces of the fiber sections is focused by a shared lens 42 mounted in the housing 39 onto the zone 35 of the surface 36 of the vibrating object 37. In this particular construction, the spots formed by the combination beam remainders issuing from the fiber sections 25, 26 and 27 usually do not coincide, but they are still close enough to one another to assure that the vibrations of one and the same zone 35 are being measured.

It is particularly advantageous to use multimode optical fiber exhibiting a limited number of modes, such as that having a core diameter of approximately 10 microns, in the arrangement of the present invention. The reason for this will become apparent from a comparison of FIGS. 4 and 5 of the drawing with one another. More particularly, if a single mode fiber were used, the signal level would undergo considerable changes in dependence on the path length mismatch or difference between the arms of the interferometer. This is shown in FIG. 4 for a situation where a GO-1000 laser diode has been used as the laser source, with −108 dBm being the approximate noise limit of the detection electronics. When, on the other hand, a multi-mode fiber is being used in the arms of the interferometer, the characteristic fringe visibility profile of the laser is repeated several times. The individual profiles overlap by an amount corresponding to the path differences between the individual modes. The net result is, as indicated in FIG. 5 of the drawing, a substantially smoother fringe visibility profile. Consequently, the signal levels from a multimode system are well in excess of the inherent noise over a greater path mismatch than when using single mode fibers, offering an improved measurement range for limited coherence length laser diodes.

While the present invention has been illustrated and described as embodied in a particular construction of a measuring arrangement, it will be appreciated that the present invention is not limited to this particular example; rather, the scope of protection of the present invention is to be determined solely from the attached claims.

I claim:

1. A method of measuring the movement of a predetermined zone of a surface of a vibrating object, comprising the steps of:
   generating a laser beam having a predetermined coherence length;
   separating the laser beam into a probe beam and a reference beam;
   delaying the reference beam relative to the probe beam by a predetermined time interval sufficient for the probe beam to travel through a predetermined distance at least corresponding to the coherence length;
   combining the thus delayed reference beam with the probe beam to form a combination beam;
   subdividing the combination beam into a plurality of substantially equal component beams;
   conducting each of the component beams along a separate path to a separate associated location spaced from the predetermined zone substantially by one-half of the distance traveled by light in said predetermined time interval between the respective associated location and the predetermined zone;
   reflecting a predetermined portion of each of the component beams at the respective associated location back into the respective path;
   directing the remainder of each of the component beams from the respective associated location to the predetermined zone for return from the predetermined zone at least predominantly back toward the respective associated location, in the form of a speckle pattern including dark speckles which may be situated at least at one but not at all of said associated locations, and into the respective path with attendant coherent interference of the probe beam part of the thus returned remainder of the respective component beam with the reference beam part of the predetermined portion of the respective component beam resulting in a return light beam modulated in dependence on the movement of the predetermined zone relative to the respective associated location except when one of the dark speckles coincides with said associated location; and
   concurrently demodulating all of the return light beams to obtain from those of them that are unaffected by the dark speckles an indication of the movement of the predetermined zone.

2. The method as defined in claim 1, wherein said conducting step includes confining each of the component beams in a separate optical fiber.

3. The method as defined in claim 1, wherein said delaying step includes conducting the probe beam in a path of a predetermined length and the reference beam in another path having a length exceeding the predetermined length by the predetermined distance.

4. The method as defined in claim 1, wherein said delaying step includes confining the probe beam in an optical fiber having a predetermined length and the reference beam in another optical fiber having a length exceeding the predetermined length by the predetermined distance.

5. The method as defined in claim 1, and further comprising the step of delaying at least one of the component beams relative to another prior to reaching the respective associated locations by a period of time that exceeds the predetermined time interval and is at least in such a predetermined ratio thereto that the reflected probe beam part stemming from one of the component beams reaches a different one of the associated locations from that associated with the one component beam out of coherence with the portions of both of the probe and reference beam that are reflected at the different associated location.

6. The method as defined in claim 5, wherein said predetermined ratio is an integral multiple of 3.

7. The method as defined in claim 1, and further comprising the step of recombining the return light beams prior to said demodulating step.

8. The method as defined in claim 1, and further comprising the step of shifting the frequency of at least one of the reference and probe beams prior to said combining step by a predetermined carrier frequency relative to that of the other beam so that the modulation of the return light beam in dependence on the movement of the predetermined zone is superimposed on the predetermined carrier frequency.

9. An arrangement for measuring the movement of a predetermined zone of a surface of a vibrating object, comprising:
   means for generating a laser beam having a predetermined coherence length;
   means for separating the laser beam into a probe beam and a reference beam;
   means for delaying the reference beam relative to the probe beam by a predetermined time interval sufficient for the probe beam to travel through a predetermined distance at least corresponding to the coherence length;
   means for combining the thus delayed reference beam with the probe beam to form a combination beam;
   means for subdividing the combination beam into a plurality of substantially equal component beams;
   means for conducting each of the component beams along a separate path to a separate associated location spaced from the predetermined zone substantially by one-half of the distance traveled by light in said predetermined time interval between the respective associated location and the predetermined zone;

- means for reflecting a predetermined portion of each of the component beams at the respective associated location back into the respective path;

means for directing the remainder of each of the component beams from the respective associated location to the predetermined zone for return from said predetermined zone at least predominantly back toward the respective associated location, in the form of a speckle pattern including dark speckles which may be situated at least at one but not at all of said associated locations, and into the respective path with attendant coherent interference of the probe beam part of the thus returned remainder of the respective component beam with the reference beam part of the predetermined portion of the respective component beam resulting in a return light beam modulated in dependence on the motion of the predetermined zone relative to the respective associated location except when one of the dark speckles coincides with said associated location; and means for concurrently demodulating all of the return light beams to obtain from those of them that are unaffected by the dark speckles an indication of the movement of the predetermined zone.

10. The arrangement as defined in claim 9, wherein said conducting means includes a plurality of separate optical fibers each confining a different one of the component beams therein.

11. The arrangement as defined in claim 9, wherein said delaying means includes means for conducting the probe beam in a path of a predetermined length and the reference beam in another path having a length exceeding said predetermined length by said predetermined distance.

12. The arrangement as defined in claim 11, wherein said conducting means of said delaying means includes an optical fiber having a predetermined length and confining the probe beam therein and another optical fiber having a length exceeding said predetermined length by said predetermined distance and confining the reference beam therein.

13. The arrangement as defined in claim 9, and further comprising auxiliary delaying means for delaying at least one of the component beams relative to another prior to reaching the respective locations by a period of time that exceeds said predetermined time interval and is at least in in such a predetermined ratio thereto that the reflected probe beam part stemming from one of the component beams reaches a different one of the associated locations from that associated with the one component beam out of coherence with the portions of both of the probe and reference beam that are reflected at the different associated location.

14. The arrangement as defined in claim 13, wherein said predetermined ratio is an integral multiple of 3.

15. The arrangement as defined in claim 13, wherein said conducting means includes a plurality of separate optical fibers each confining a different one of the component beams therein and one having a predetermined length; and wherein at least one other of said optical fibers has one section of said predetermined length and another section consecutive with said one section and having a length that is in said predetermined ratio to said predetermined distance to consitute said auxiliary delaying means.

16. The arrangement as defined in claim 9, and further comprising means for recombining the return light beams prior to reaching said demodulating means.

17. The arrangement as defined in claim 16, wherein said combining, subdividing and recombining means are constituted by a fiber-optic coupler.

18. The arrangement as defined in claim 9, and further comprising means for shifting the frequency of at least one of the reference and probe beams prior to reaching said combining means by a predetermined carrier frequency relative to that of the other beam so that the modulation of the return light beam in dependence on the movement of the predetermined zone is superimposed on the predetermined carrier frequency.

* * * * *